United States Patent [19]

Peloza

[11] 4,361,170

[45] Nov. 30, 1982

[54] BUTTERFLY BYPASS VALVE

[75] Inventor: Kirk Peloza, Glen Ellyn, Ill.

[73] Assignee: Eaton Corporation, Cleveland, Ohio

[21] Appl. No.: 238,305

[22] Filed: Feb. 26, 1981

Related U.S. Application Data

[62] Division of Ser. No. 55,662, Jul. 9, 1979, abandoned.

[51] Int. Cl.$^3$ .............................................. F16K 1/22
[52] U.S. Cl. .............................. 137/625.29; 251/305;
251/61.5; 237/8 A; 165/35
[58] Field of Search .................. 137/625.29; 237/8 A;
165/35; 251/305, 61.5

[56] References Cited

U.S. PATENT DOCUMENTS

| | | | |
|---|---|---|---|
| 2,105,193 | 1/1938 | Kysor | 237/8 A |
| 2,113,775 | 4/1938 | Vulpen | 137/625.29 X |
| 2,526,923 | 10/1950 | Alessandro | 137/625.29 X |
| 3,052,445 | 9/1962 | Kessler | 251/368 X |
| 3,779,307 | 12/1973 | Weiss et al. | 165/35 |

FOREIGN PATENT DOCUMENTS 2425300 10/1975 Fed. Rep. of
Germany .......................... 137/625.29

*Primary Examiner*—Arnold Rosenthal
*Attorney, Agent, or Firm*—C. H. Grace; F. M. Sajovec

[57] ABSTRACT

A passenger vehicle heater core fluid flow system and bypass valve (10) therefor is disclosed having a butterfly valve member (24) rotatably mounted in a primary fluid passageway (14) and intermediate first (20) and second (21) fluid ports which fluidly communicate with the primary passage. Third (22) and fourth (19) ports are in fluid communication with the primary passageway and spaced at each end thereof. The first and third ports are connected to high and low pressure locations on the engine cooling system respectively. The fourth port is connected to the heater core inlet and the second port is connected to the heater core outlet. When the valve is in an open position, a pair of isolated parallel flow paths are defined by flow through the first and fourth ports and by flow through the second and third ports. In the closed position flow enters the first port and immediately exhausts from the third port without entering the heater core flow path, thereby preventing heat transfer to the heater core.

6 Claims, 9 Drawing Figures

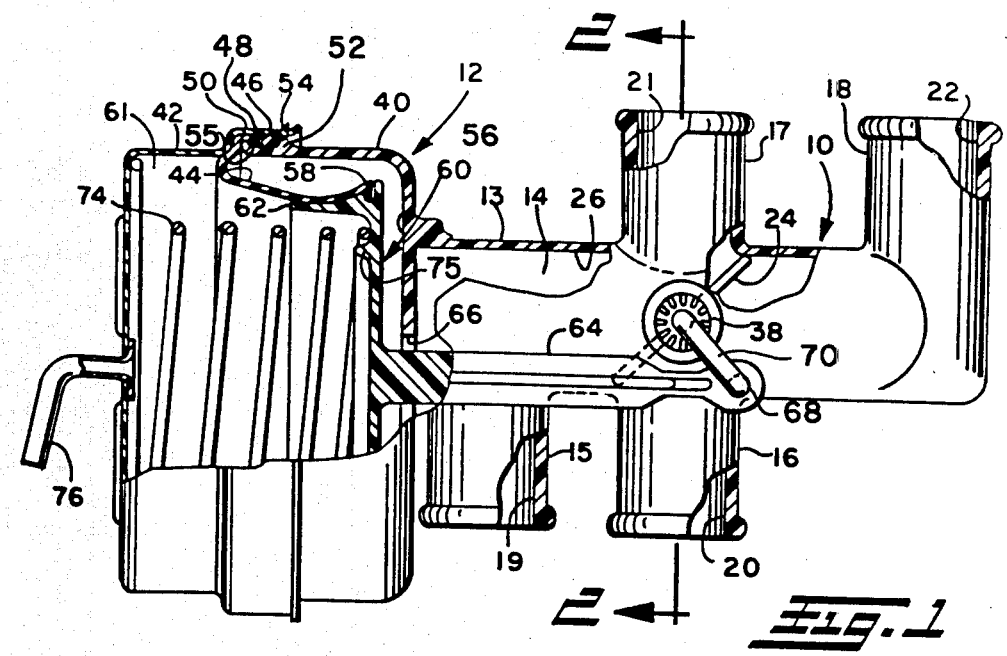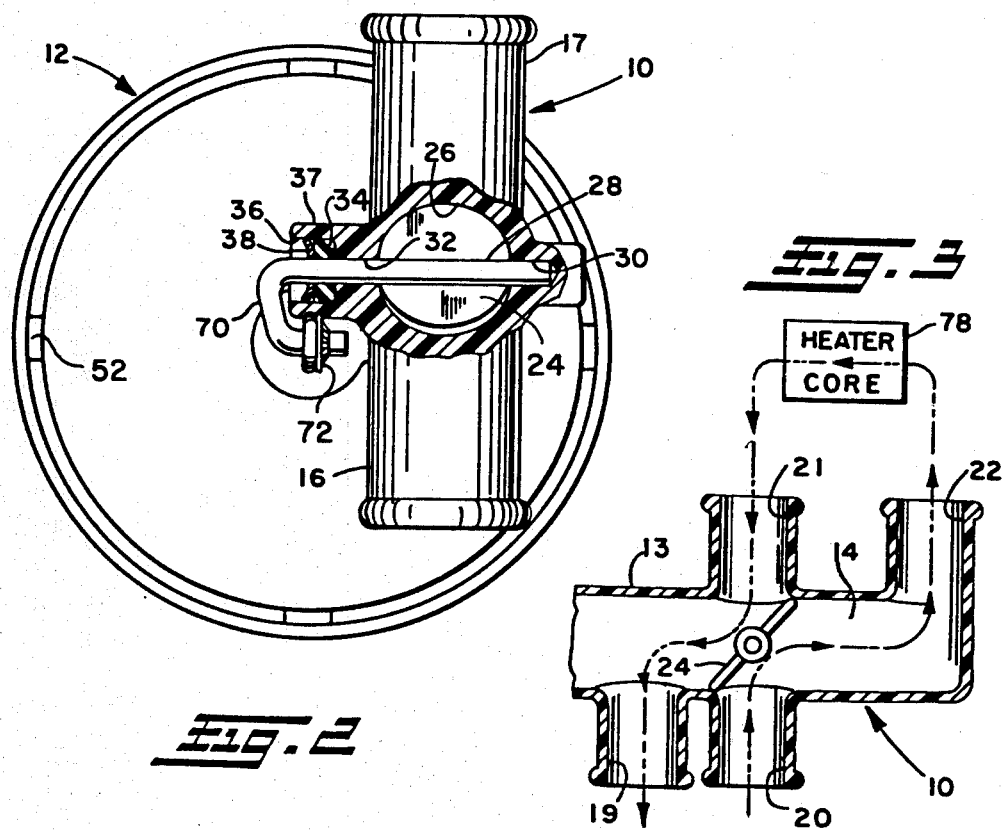

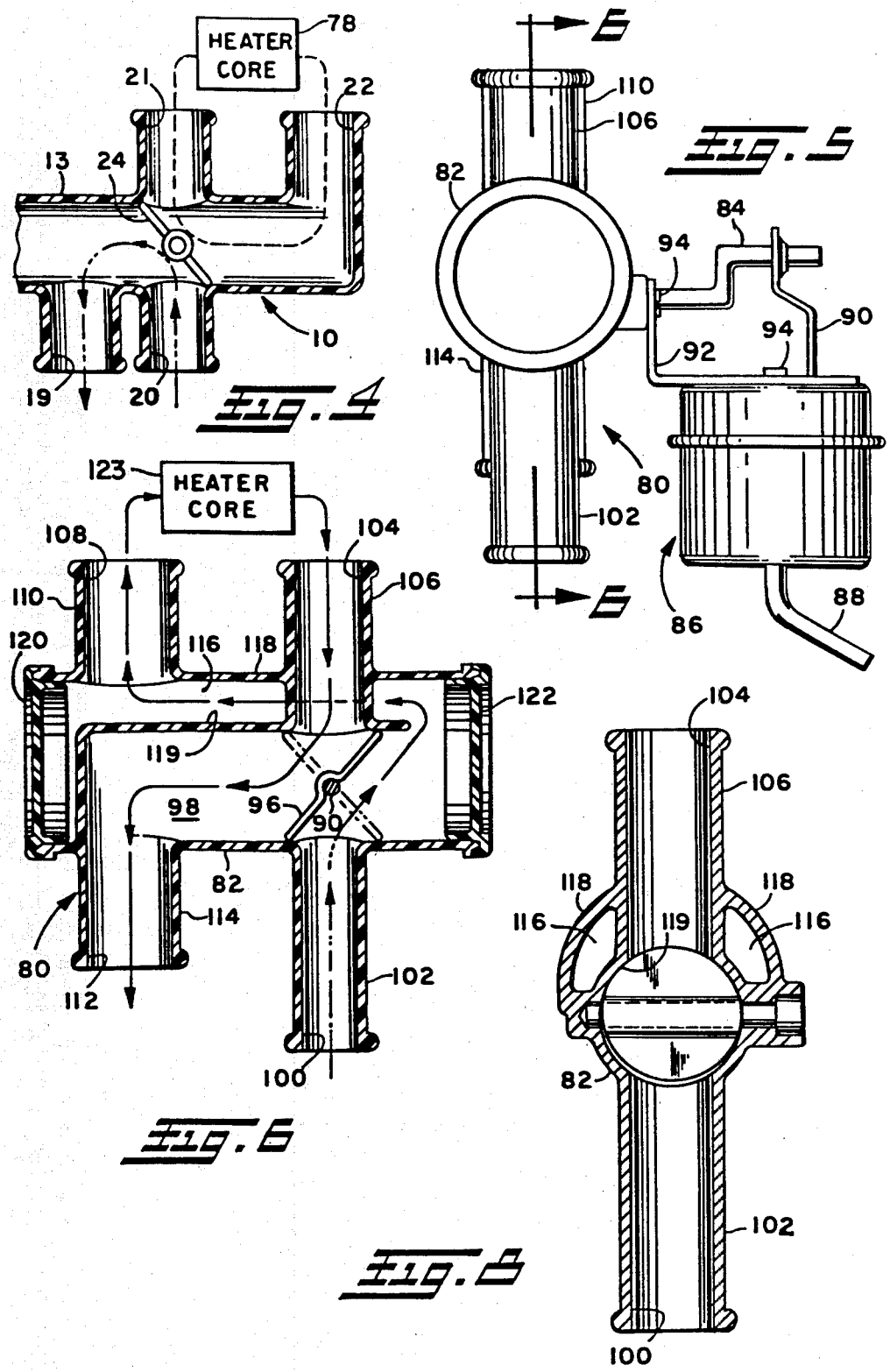

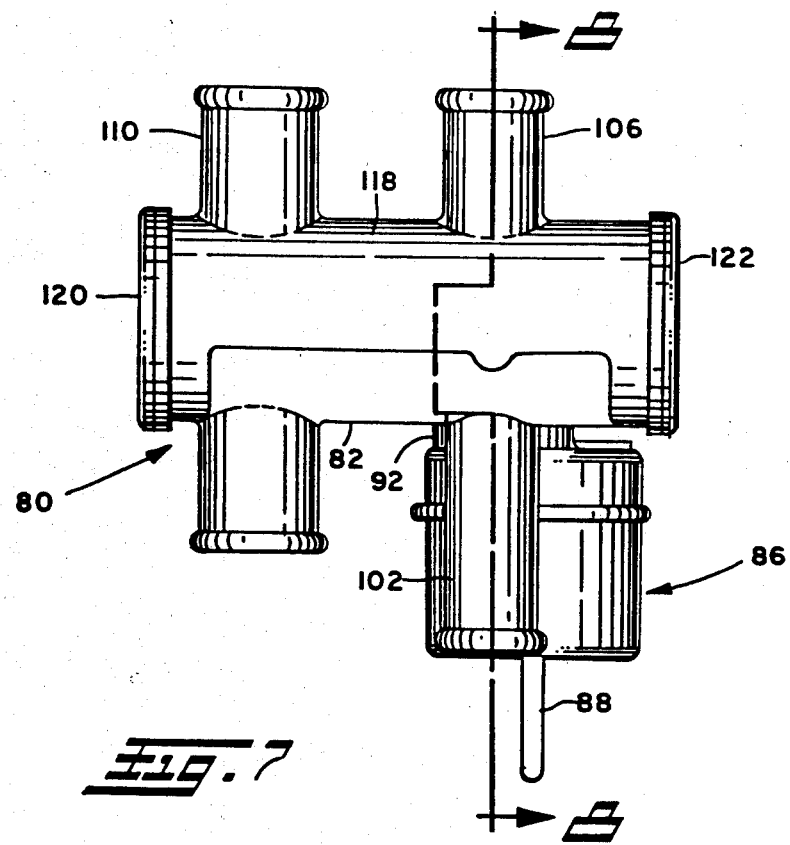

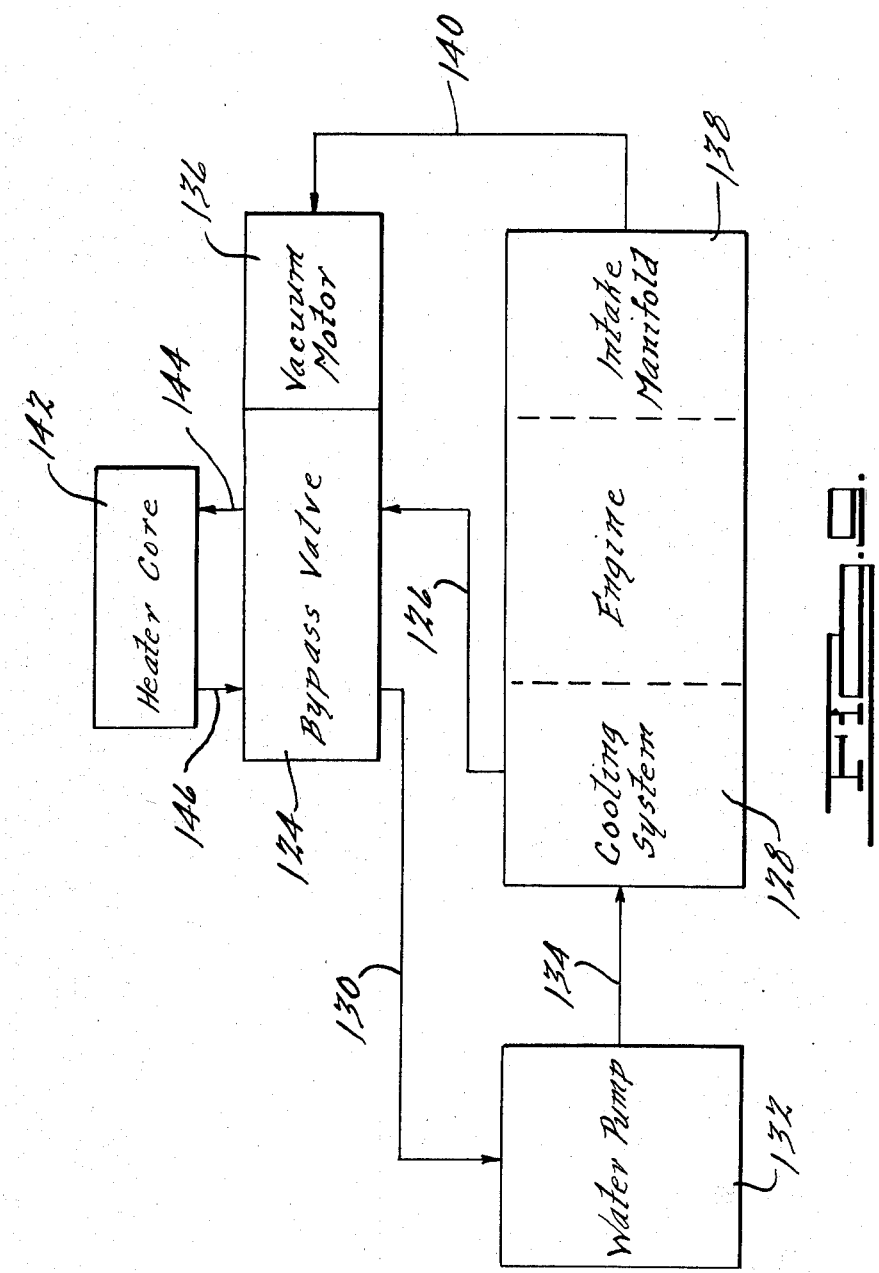

BUTTERFLY BYPASS VALVE

This is a division of application Ser. No. 55,662, filed July 9, 1979, now abandoned.

BACKGROUND OF THE INVENTION

This invention relates to fluid flow systems and valves for circulating heated water from an engine cooling system to a heater core of a vehicle passenger compartment heating system. The present invention is particularly useful in heater systems which are operated in association with a vehicle air conditioning system and which require minimal heat transfer to the heater core.

DESCRIPTION OF THE PRIOR ART

Known prior art valves presently in use for circulating pressurized engine cooling fluid to a vehicle heating system heater core include two-way spool type valves which function to either permit the engine cooling fluid to flow through a by-pass passageway or alternatively through the heater core. Spool valves of this type are relatively sensitive to seal failure from contamination trapped between the O-rings on the spool and the corresponding sealing surfaces. Leakage through or around a seal results in unwanted fluid flow to the heater core.

Systems incorporating the spool valve defined above allow convective heat transfer to the heater core since the bypass line and outlet from the heater core are fluidly in common. This condition results in needless heating of the heater core which requires additional power usage to cool air flowing therepast.

Other known cooling system arrangements incorporate a butterfly type water valve fluidly in series with a heater core and in parallel with a by-pass fluid passageway. In this type system, leakage of the butterfly valve member allows unwanted high temperature coolant flow to the heater core and also an excessive amount of fluid continues to flow through the by-pass conduit. Although this problem could be alleviated by placing another water valve in the by-pass fluid passageway, this alternative is not feasible due to the cost of the additional valve.

A further problem associated with known butterfly valve arrangements is that the elastomeric or rubber sealing lip around the periphery of the valve member requires a relatively high seating torque to the pivot member which consequently necessitates increased valve actuator capacity.

SUMMARY OF THE INVENTION

In the present invention a bypass valve is provided which, in the open position, diverts pressurized engine coolant through the valve to a heater core of an engine heating system and return flow through the valve to a low pressure fluid location in the engine cooling system. In the closed position flow is by-passed through the valve and returned to the intake of the water pump, thereby substantially isolating the engine heater core from high temperature engine coolant.

The invention valve incorporates a rotatably mounted butterfly valve member located within a valve body intermediate first and second coaxially aligned fluid ports located on opposite sides of the valve body. The valve member has an elliptical shape which is conformable to first and second elliptically shaped valve seats defined by the internal surface of a cylindrically shaped fluid passageway in the valve body. The valve seats are located intermediate the first and second fluid ports. The valve body also defines third and fourth fluid ports on either side of the first and second ports. By connecting the heater core between the fourth and second fluid ports and the first and third ports to high pressure and low pressure connections on the engine cooling system flow path, flow can be diverted to the heater core or directed through a by-pass passageway formed by the valve body and the valve member. During the closed or by-pass mode of valve operation engine coolant is substantially prevented from flowing through the heater core.

The valve of the present invention incorporates a stainless steel valve member which is resistant to corrosion and which does not require an elastomeric or rubber sealing lip since a small amount of leakage past the valve member in either position has a negligible effect upon heat transfer to the heater core. The metallic valve member employed in the present invention requires only a minimal amount of actuating torque for operation and can therefore be operated by a relatively small size vacuum motor, electrical solenoid, or any other suitable actuating means.

A second embodiment of the invention has a unique fluid passageway configuration which minimizes the space required for the valve. The valve body defines an overlapping fluid passageway which is integrally molded therewith and which extends parallel to a central fluid passageway. The overlapping structure significantly reduces the overall length of the valve because the ports need not be staggered.

The invention includes a fluid flow system uniquely suited to passenger vehicle heating and cooling systems and comprises a flow path which in one selectively closed position is a continuous path defined by flow through a portion of the cooling system, through ports one and three of the valve, to a water pump, and a return flow to the engine cooling system. In this closed position the heater core is totally isolated from a high temperature engine cooling fluid.

In the open position, pressurized cooling fluid follows a path from the engine cooling system, through ports one and four of the valve, to the inlet of the heater core, from the outlet of the heater core through ports two and three of the valve, through the water pump, and a return path to the engine cooling system.

This system offers the advantage of eliminating heat transfer to the heater core when passenger compartment heating is not required. Needless heating of the heater core places an additional power load on the air conditioner compressor which must then cool overheated air flowing past the heater core.

DESCRIPTION OF THE DRAWINGS

FIG. 1 is a side elevational view of the invention in partial cross-section and shown in associated with a vacuum motor;

FIG. 2 is an end view in elevation taken from the right hand side of FIG. 1 showing the alignment of the fluid ports of the valve body;

FIG. 3 is a partial cross sectional view of the valve body showing the valve member in an open position with the black arrows representing fluid flow through the valve to a schematically represented heater coil;

FIG. 4 is a view similar to FIG. 3 showing the valve member in a closed position with fluid flow represented by the black arrows;

FIG. 5 is an end view in elevation of a second embodiment of the invention;

FIG. 6 is a cross-sectional view taken through lines 6—6 of FIG. 5;

FIG. 7 is a side elevational view of the FIG. 5 embodiment; and

FIG. 8 is a cross-sectional view through lines 8—8 of FIG. 7; and

FIG. 9 is a block diagram illustrating a passenger vehicle heater core fluid flow system according to the invention.

DETAILED DESCRIPTION

Referring now to FIGS. 1 and 2, the invention valve, indicated generally by reference numeral 10, is shown in association with a vacuum motor indicated generally by reference numeral 12. Valve 10 includes a valve body 13 which defines an elongated fluid passageway 14 and tubular extensions 15, 16, 17 and 18 molded integrally therewith which in turn define fluid ports 19, 20, 21 and 22, respectively, all of which are in fluid communication with fluid passageway 14. Extensions 16 and 17 are coaxially aligned on opposite sides of valve body 13 while extensions 15 and 18 are spaced on either side thereof. Fluid ports 19, 20, 21 and 22 are also respectively designated as third, first, second, and fourth fluid ports.

An elliptically shaped butterfly valve member 24 is rotatably mounted in fluid passageway 14 and, as shown in FIGS. 3 and 4, is rotatable between a first (shown in FIG. 3) and second position (shown in FIG. 4), respectively.

Passageway 14 has a cylindrically shaped internal surface 26 which defines first and second valve seats. The first and second valve seats are understood to be located on portions of internal surface 26 along those surfaces contacted by the periphery of valve member 24 as it is seated in the first and second position, and as such are not designated by reference numerals. It should be noted that the dimension of elliptical valve member 24 in the direction of its major axis must be large enough to span the internal diameters of fluid ports 20 and 21 while in the first or second position.

As shown in FIG. 2, valve member 24 is attached to a crank member 28 preferably by welding. Bores 30 and 32 are formed in valve body 13 and provide bearing surfaces for rotatably mounting the straight portion of crank 28. An elastomeric O-ring 34 is in sealing engagement with the periphery of crank 28 and also a counterbore 36 formed in a boss 37 of valve body 13. A retaining washer 38 has its outer edges barbed and when pressed into counterbore 36 functions to retain O-ring 34 against the shoulder intermediate bores 36 and 32.

Crank 28 intersects and is perpendicular to a longitudinal axis through first and second fluid ports 20 and 21 and fluid passageway 14. This mounting arrangement permits butterfly valve member 24 to prevent direct fluid flow between the first and second fluid ports when positioned in either the first or second positions.

As shown in FIG. 1, vacuum motor 12 includes a lower housing 40 and an upper housing 42. A flexible diaphragm 44 has an outer peripheral bead 46 seated in an annular groove 48 molded into the wall of lower housing 40. Bead 47 sealingly engages with an internal annular surface 50 of upper housing 42 and lower housing 40 thereby providing a fluid tight seal at the junction of the lower and upper housings. Four radially extending locking tabs 52 are formed adjacent the outer edge of the lower housing and extend through corresponding slots 54 located in upper housing 42. A shoulder 55 is formed adjacent the open end of lower shell 42 and abuts with portions of diaphragm 55. The tab slot arrangement exerts a squeeze on bead 46 and portions of diaphragm 44, thereby providing sealing and preventing axial play between the lower and upper housings. An inner peripheral bead 56 is formed on diaphragm 44 and is seated in an annular groove 58 formed in a reaction member, indicated generally by reference numeral 60. A vacuum chamber 61 is defined by the space between diaphragm 44, the internal surface of housing 42, and reaction member 60. Reaction insert 60 includes a cup-shaped portion 62 disposed within the chamber defined by housings 40 and 42 and an elongated stem portion 64 which extends through an opening 66 formed in the lower housing. An eyelet 68 is formed through the right end of stem 64 and is received over the free end of a U-shaped portion 70 formed on the left end of crank 28.

A retaining washer 72 is received over the free end of U-shaped portion 70 and retains stem 64 thereon. A spring 74 has its left end seated against the inner transverse surface of housing 42 and its right end seated against the bottom left surface of cup-shaped portion 62. An annular projection 76 extending from the bottom surface of cup-shaped portion 62 functions to maintain reaction insert 60 in radial alignment relative to housings 40 and 42. An angled adapter tube 76 is connected to housing shell 42 and provides a connection to a vacuum line, not shown, operably connected to the engine intake manifold.

The operation of the valve will now be described with reference to FIGS. 3 and 4 which show the fluid flow direction represented by black arrows. An engine heating system heater core is shown schematically by reference numeral 78 and is connected between fluid ports 21 and 22 by fluid conduits, not shown.

In the absence of a low pressure signal of predetermined magnitude to vacuum chamber 61, spring 74 maintains stem 64 in the position shown by FIG. 1 whereby valve member 24 is seated against the first valve seat. In this position fluid flow between ports 19 and 20 is blocked. As shown by the arrows of FIG. 3, fluid entering port 20 will be deflected rightwardly by valve member 24 where it then flows along fluid passageway 14, exhausts through port 22, flows through a fluid conduit, not shown, to heater core 78, through another fluid conduit, not shown, into port 21, is deflected past valve member 24, where the fluid then exhausts through port 19.

FIG. 4 shows the butterfly valve member 24 actuated to the second position by the presence of a low pressure condition in vacuum chamber 61 sufficient to create a differential pressure across diaphragm 44 which overcomes the resisting force generated by spring 74. Fluid entering port 20 is deflected leftward by butterfly valve member 24 where it then exhausts through port 19 and returns to the engine cooling system. Fluid no longer circulates through heater core 78, although fluid is present in the right half of the valve and the heater core as represented by the dashed lines of FIG. 4.

Referring now to FIG. 5, a second embodiment of the invention valve is indicated generally at reference numeral 80 and includes a valve body 82 and an output crank member 84 which has a portion extending into housing 82. Valve 80 is shown as connected to a vacuum motor indicated generally at 86 having a nipple 88 at one end thereof for communicating a vacuum signal to the vacuum motor and an output member 90 extending from the upper end thereof. The internal structure of vacuum motor 86 is substantially similar to vacuum motor 12 which has been described above in detail and shown by FIG. 1. Vacuum motor 86 is connected to valve body 82 by means of a bracket 92 and screws 94. As best shown by FIG. 6, valve 80 includes a valve member 96 formed of a suitable stainless steel material pivotally mounted within an elongated fluid passageway 98 defined by a valve body 82. Valve member 96 is connected to crank 90 by means of a welded connection.

Integrally molded with valve body 80 are a first fluid port 100 formed by a tubular extension 102, a second fluid port 104 defined by a tubular extension 106, a third fluid port 108 defined by tubular extension 110, and a fourth fluid port 112 defined by tubular extension 114. As shown in FIGS. 6 and 8, fluid present in the right hand side of central fluid passageway 98 is fluidly in common with fluid in third fluid port 108 by means of an auxiliary fluid passageway 116 which is defined by an outer wall portion 119 and an inner wall portion 118 of valve body 82. Extension 106 passes through passageway 116, thereby permitting fluid in the right side of passageway 98 to flow around the exterior of extension 106 and through passageway 116 to fluid port 108. End caps 120 and 122 are received over the left and right ends of housing 82, respectively, and in sealing engagement therewith to close the fluid passages.

In operation, with valve member 96 in he position shown by FIG. 6, pressurized heated cooling fluid enters the valve body through first fluid port 100 where it then enters passageway 98 and is deflected to the right end of passageway 98. The fluid then flows into passageway 116 and around tubular extension 106 and into fluid port 108 where it is then conveyed by a fluid conduit, not shown, to a heater core 120. Fluid exhausting from the heater core flow through a fluid conduit, not shown, to fluid port 104. The fluid re-entering port 104 is deflected by valve member 96 toward the left side of passageway 98 where it then exhausts through fourth fluid port 112 and eventually to a lower pressure location along the engine cooling system.

When valve member 96 is in the position shown by the dashed lines of FIG. 6, fluid flow is substantially prevented from flowing to heater core 120 by valve member 96 which deflects the flow leftwardly where it then exhausts directly through fluid port 112.

Referring now to FIG. 9, there is shown schematically a passenger vehicle heater core fluid flow system comprising a bypass valve 124 according to the invention as embodied in valves 10 and 80 as shown and described above, an inlet conduit 126 connected between valve 124 and an engine cooling system 128, an outlet conduit 130 connected between valve 124 and a water pump 132 which circulates fluid through the system, and a conduit 134 between the water pump and the cooling system. A means for actuating bypass valve 124 as shown as including a vacuum motor 136 operated by a vacuum source, for example, that provided by an intake manifold 138 communicated to motor 36 by a line 140. A heater core 142 is connected to bypass valve 124 by an inlet conduit 144 and an outlet conduit 146. Conduit 126 is connected to a valve port corresponding to port 20, conduit 130 is connected to a valve port corresponding to port 19, conduit 144 is connected to a valve port corresponding to port 22, and conduit 146 is connected to a valve port corresponding to port 21.

In response to selective actuation by a suitable actuation means, bypass valve 124 is movable to either an open or closed position as described above. In the closed position, high temperature fluid enters the valve and immediately exhausts therefrom in a manner which substantially isolates fluid flow and heat transferred from the heat core.

In the open position fluid flows in one direction through the valve to the heater core and from the heater core through the valve in an opposite direction. This parallel flow condition is shown in detail by FIG. 3.

It will be understood by those having ordinary skill in the art that modifications and variations of the invention may be made without departing from the scope of the invention which is more particularly described in the following claims.

What is claimed is:

1. A fluid valve for supplying pressurized fluid to a vehicle heating system heater core, said valve comprising:
   (a) body means, said body means defining
      (i) an elongated fluid passageway,
      (ii) first and second fluid ports in communication with said fluid passageway, said first and second fluid ports being disposed on opposite sides of said valve body,
      (iii) a third fluid port in fluid communication with said fluid passageway and spaced longitudinally therealong from said first and second fluid ports,
      (iv) a fourth fluid port in fluid communication with said fluid passageway and spaced longitudinally therealong from said first and second fluid ports,
   (b) a valve member rotatably mounted to said valve body and located in said fluid passageway intermediate said first and second fluid ports, said valve member rotatable between a first position in fluid sealing engagement with first portions of said passageway and a second position in fluid sealing engagement with second portions of said passageway, such that in said first position said valve member permits fluid flow through said first port to flow through said fourth fluid ports and flow through said second port to flow through said third fluid port, and in said second position said valve member permits fluid flow through said first port to flow through said third fluid ports and through said second and fourth fluid ports;
   (c) said first and second ports are located generally at a first longitudinal station along said passageway defined by said valve member;
   (d) said third and fourth ports are located generally at a second longitudinal station relative said passageway, said fourth port being in direct fluid communication with said passageway; and
   (e) said body means further including auxiliary passageway means for communicating said third port with said elongated passageway at a location remote from said first longitudinal station.

2. A valve as defined in claim 1, wherein said valve member is formed of a metallic material.

3. A valve as defined in claim 1, wherein said valve member is formed of a stainless steel material.

4. A valve as defined in claim 1, further including actuator means operably connected to said valve member and energizable for rotating said valve member between said first and second positions.

5. A valve as defined in claim 1, further including actuator means operably connected to said valve member and energizable for rotating said valve member between said first and second positions, said actuator means including a pneumatically actuated motor having a spring biased de-energized position for maintaining said valve member in said first position and an energized position for actuating said valve member to said second position.

6. A valve as defined in claim 1, wherein said body means includes,
 (a) a first portion defining said first, second, third and fourth fluid ports, said elongated passageway and said auxiliary passageway means;
 (b) said elongated passageway defined by said first portion having an open end and said auxiliary passageway means having an open end;
 (c) a first end cap received over said open end of said elongated passageway; and
 (d) a second end cap received over said open end of said auxiliary passageway means.

* * * * *